(12) United States Patent  
Kunze et al.

(10) Patent No.: US 12,311,929 B2  
(45) Date of Patent: May 27, 2025

(54) LANE-RELATED VISUAL ASSISTANCE FUNCTION IN A HEAD-UP DISPLAY FOR A MOTOR VEHICLE

(71) Applicant: Volkswagen Aktiengesellschaft, Wolfsburg (DE)

(72) Inventors: Alexander Kunze, Berlin (DE); Adrian Haar, Hannover (DE); Michael Wittkämper, Braunschweig (DE); Johanna Sandbrink, Braunschweig (DE); Vitalij Sadovitch, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 620 days.

(21) Appl. No.: 17/492,355

(22) Filed: Oct. 1, 2021

(65) Prior Publication Data  
US 2022/0105805 A1 Apr. 7, 2022

(30) Foreign Application Priority Data  
Oct. 5, 2020 (DE) .......................... 102020212562.7

(51) Int. Cl.  
*B60K 35/00* (2024.01)  
*B60R 1/24* (2022.01)  
(Continued)

(52) U.S. Cl.  
CPC .............. *B60W 30/12* (2013.01); *B60K 35/00* (2013.01); *B60R 1/24* (2022.01); *G06V 20/20* (2022.01);  
(Continued)

(58) Field of Classification Search  
CPC ........... B60W 30/12; B60W 2050/146; B60W 2420/42; B60W 50/14; B60K 35/00;  
(Continued)

(56) References Cited

U.S. PATENT DOCUMENTS

| 9,403,436 B1 | 8/2016 | Yamada |
| 2005/0065721 A1 | 3/2005 | Herrtwich et al. |

(Continued)

FOREIGN PATENT DOCUMENTS

| CN | 101228042 A | 7/2008 | |
| CN | 110595494 A | * 12/2019 | ............. G01C 21/20 |

(Continued)

OTHER PUBLICATIONS

Machine Translation: WO-2018105835-A1 (Year: 2018).*

(Continued)

*Primary Examiner* — Anne Marie Antonucci  
*Assistant Examiner* — Connor L Knight  
(74) *Attorney, Agent, or Firm* — Peter Zura; LOZA & LOZA, LLP

(57) ABSTRACT

A head-up display and methods for providing a lane-related visual assistance function with a head-up display for a motor vehicle. Information is obtained regarding a driving lane currently travelled on by a motor vehicle. A characteristic value is obtained, which describes an uncertainty regarding the lane-related display of a virtual object serving as a visual assistance function with the head-up display. At least one virtual object is displayed as a visual assistance function, wherein the object is displayed such that it runs along at least a portion of the lane from the perspective of the driver, wherein a length of the object along the lane is defined according to the magnitude of the characteristic value.

19 Claims, 1 Drawing Sheet

(51) Int. Cl.
- *B60W 30/12* (2020.01)
- *G06V 20/20* (2022.01)
- *G06V 20/56* (2022.01)
- *B60K 35/23* (2024.01)
- *B60K 35/28* (2024.01)
- *B60K 35/29* (2024.01)

(52) U.S. Cl.
CPC ............ *G06V 20/588* (2022.01); *B60K 35/23* (2024.01); *B60K 35/28* (2024.01); *B60K 35/29* (2024.01); *B60K 2360/176* (2024.01); *B60K 2360/1868* (2024.01); *B60K 2360/31* (2024.01)

(58) Field of Classification Search
CPC ...... B60K 2370/1529; B60K 2370/176; B60K 2370/1868; B60K 2370/31; B60K 2370/1526; B60K 2370/168; B60K 2370/177; B60K 2370/52; B60R 1/24; B60R 2300/205; B60R 2300/8086; B60R 1/00; G06V 20/20; G06V 20/588; G06T 11/00; G02B 2027/0138; G02B 2027/0183; G02B 27/01; G08G 1/167
See application file for complete search history.

(56) References Cited

U.S. PATENT DOCUMENTS

| | | |
|---|---|---|
| 2010/0001883 A1 | 1/2010 | Koenig |
| 2014/0244068 A1* | 8/2014 | Dariush ................ G08G 1/166 701/1 |
| 2016/0155267 A1* | 6/2016 | Bean ................... G02B 27/017 345/633 |
| 2017/0154554 A1 | 6/2017 | Tanaka et al. |
| 2018/0148072 A1 | 5/2018 | Kamiya et al. |
| 2018/0164998 A1* | 6/2018 | Fujita ........................ G06T 3/40 |
| 2018/0373941 A1 | 12/2018 | Kwant et al. |
| 2019/0043392 A1 | 2/2019 | Abele |
| 2019/0071080 A1 | 3/2019 | Shimizu |
| 2019/0106121 A1* | 4/2019 | Kamiya ................ B60W 50/14 |
| 2020/0307576 A1* | 10/2020 | Takegawa ............. B60K 35/00 |

FOREIGN PATENT DOCUMENTS

| | | | |
|---|---|---|---|
| DE | 102005033641 A1 | | 1/2007 |
| DE | 102005046672 A1 | | 4/2007 |
| DE | 102009020328 A1 | | 11/2010 |
| DE | 112010003874 T5 | | 6/2014 |
| DE | 102014201965 A1 | | 8/2014 |
| DE | 112014007007 T5 | | 6/2017 |
| DE | 102017220268 A1 | | 5/2019 |
| DE | 102019206490 B3 | | 3/2020 |
| EP | 3088268 B1 | | 2/2020 |
| FR | 3060774 A1 | | 6/2018 |
| JP | 2005038225 A | | 2/2005 |
| KR | 20190061137 A | * | 6/2019 |
| WO | WO-2018105835 A1 | * | 6/2018 ......... G02B 26/0816 |

OTHER PUBLICATIONS

Machine Translation: KR-20190061137-A (Year: 2019).*
Machine Translation: CN-110595494-A (Year: 2019).*
EP211963889. Extended European Search Report (Feb. 9, 2022).

* cited by examiner

LANE-RELATED VISUAL ASSISTANCE FUNCTION IN A HEAD-UP DISPLAY FOR A MOTOR VEHICLE

CROSS REFERENCE TO RELATED APPLICATION

The present application claims priority to German Patent Application No. DE 102020212562.7, to Kunze, et al., filed Oct. 5, 2020, the contents of which being incorporated by reference in its entirety herein.

FIELD OF TECHNOLOGY

The present disclosure relates to technologies and techniques for providing a lane-related visual assistance function in a head-up display configured for a motor vehicle. The motor vehicle (vehicle) can be a passenger car or a truck.

BACKGROUND

Head-up displays (HUDs) for showing virtual objects, or, in other words, virtual content in a driver's field of view, are known in the automotive industry. From the perspective of the driver, the virtual objects are superimposed on the environment. These objects can be displayed in the known manner on the inside of a windscreen, e.g., by projecting the objects thereon. Separate projection surfaces, and transparent projection screens in particular, on which the objects are projected, are also known. The technological background for head-up displays in general is disclosed, e.g., in US 2019/0043392 A1 and FR 3 060 774 A1.

A head-up display with expanded reality is known from DE 10 2019 206 490 B3. Graphics are shown thereon as a function of the distance of the motor vehicle to an object in the environment of the motor vehicle such that they overlap the environment at the right position. This can also be referred to as a "contact-analog" display.

DE 10 2017 220 268 A1 discloses determining an uncertainty when generating virtual displays with a head-up display and the adjustment of the display on the basis thereof.

Lane keeping assistance for a driver through visual displays on a head-up display is also generally known.

It has been realized that with the prior solutions, displays still do not always have the desired precision or are appropriately tailored to the current situation. This can mean that the display may be based on an inappropriately detected state of the environment, which does not correspond to the actual situation. As a result, the display may be in the wrong position in the driver's field of view, or it may display or emphasize the state of the environment in an irrelevant manner. One example of this would be the displaying of curved objects that should indicate a curved road lane, when in fact, the real lane is straight.

This relates in particular to lane-related displays, which are to be positioned in relation to the lane, the size, shape, curvature and/or extension of which are to be oriented in relation to a driving lane.

There is therefore a need to design lane-related displays of objects with a head-up display that are more reliable.

SUMMARY

This objective is achieved by the methods and head-up display recited in the features of the independent claims. Advantageous developments are described in the dependent claims.

It is proposed in general that an uncertainty concerning the lane-related display be determined, as is already described in part for displays in the prior art in general. The present approach differs therefrom in that the displays are also adjusted with regard to the current situation on the basis of this uncertainty, taking their relationship to the driving lane into account.

In particular, it is proposed for this that a length of a displayed object be adjusted, and preferably be increasingly reduced as the uncertainty increases.

In general, this provides the driver with visual feedback regarding the current uncertainty. In particular, the risk that the driver is provided with displays that are not appropriate to the situation is reduced. This consequently improves the quality of the displays, or the quality of the assistance function. The detection precision of environment sensors does not need to be improved for this, nor do control units for analyzing sensor or map data need to demonstrate a higher performance capability. Instead, the operating of the head-up display can be adjusted to the uncertainty, without necessarily having to make adjustments to the hardware in order to prevent inappropriate displays.

As a further advantage, it has been realized that a discrepancy between a course of the driving lane indicated or suggested by the object (in particular a curvature) and the actual course of the driving lane can be reduced with the solution disclosed herein. It has demonstrated to be the case that the vehicle in particular can detect upcoming sections of the driving lane with lower precision, or the above discrepancy may be more significant there. This relates to driving through a roundabout or an intersection. In these cases, changes in the curvatures of the driving lanes may not be noticed in time, and objects may be displayed without curved virtual lane boundaries.

In particular, a method is proposed that provides a lane-related visual assistance function in a head-up display for a motor vehicle, in which the method comprises:
- obtaining information (and properties in particular) relating to a lane that the motor vehicle is currently travelling on;
- obtaining a characteristic value that describes an uncertainty regarding the lane-related display of virtual objects serving as visual assistance functions with a head-up display; and
- displaying at least one virtual object in the form of a visual assistance function, wherein the object is displayed such that it runs at least in part along the driving lane from the perspective of the driver;

wherein a length of the object along the driving lane is determined according to the magnitude of the characteristic value (and preferably becomes shorter as the uncertainty increases).

In some examples, the present disclosure also relates to a head-up display for a motor vehicle, which is configured to:
- obtain information regarding a driving lane currently travelled on by the vehicle (e.g., via a communication connection to an environment sensor in the vehicle and/or through analysis of map data preferably carried out by a control unit in the head-up display system);
- obtain a characteristic value (or determine such a characteristic value on the basis of the obtained information by means of a control unit in the head-up display system), which describes an uncertainty regarding the lane-related display of virtual objects serving as visual assistance functions with the head-up display;
- display at least one virtual object as a visual assistance function, wherein the object is displayed such that it runs along the lane from the perspective of the driver, wherein a length of the object along the lane is defined according to the magnitude of the characteristic value (this preferably takes place by means of a control unit in the head-up display system).

The control unit for the head-up display can be any control unit of the type described herein. In general, the head-up display can be designed to execute a method according to any of the aspects specified herein. It can exhibit any of the developments and features necessary for all of the measures, steps and effects specified herein.

BRIEF DESCRIPTION OF THE DRAWINGS

Exemplary embodiments of the present disclosure shall be explained below in reference to the schematic drawings. Therein.

DETAILED DESCRIPTION

Figure 1:
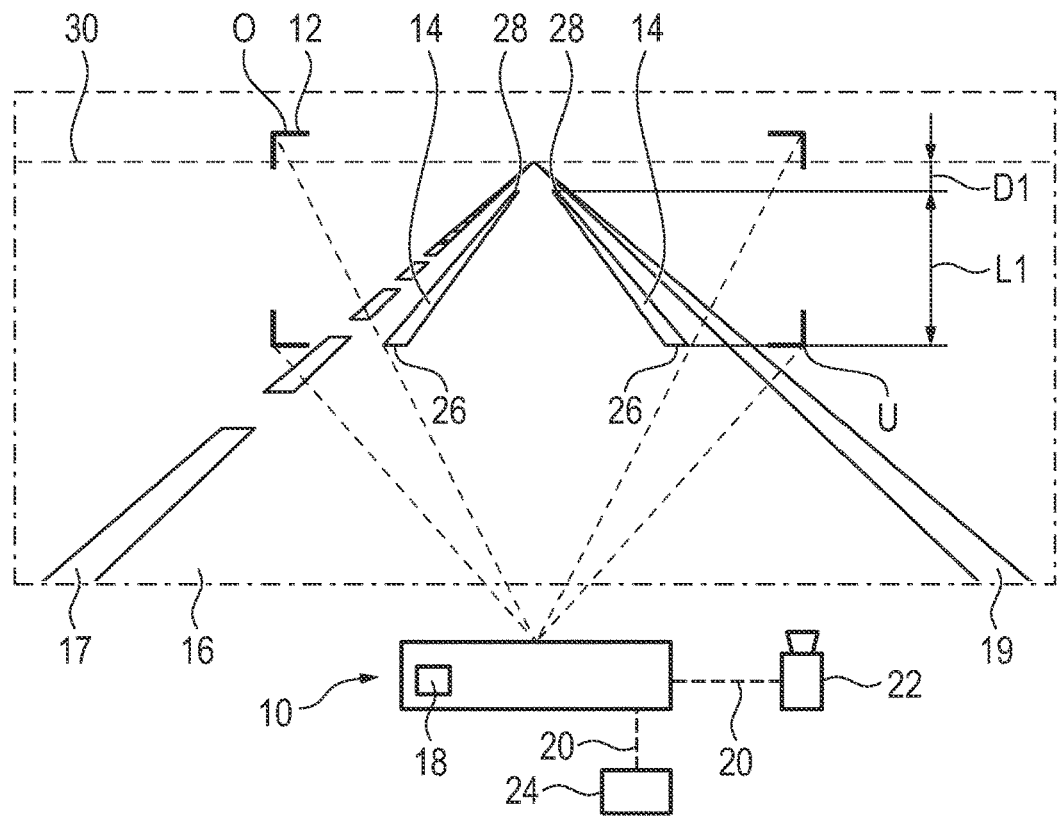
FIG. 1 shows a simplified schematic, illustrating a head-up display according to an exemplary embodiment, and a display of virtual objects generated therewith, which overlap the environment from the driver's perspective.

The present disclosure provides a lane-related visual assistance function in a head-up display for a motor vehicle. In some examples, the method can also include a step for obtaining information regarding the driving lane. By way of example, this information can be obtained by means of at least one environment sensor (in particular a camera recording the driving lane) and/or by analyzing map data.

The information can relate to a spatial orientation and/or position, and at least one spatial dimension (in particular the width) and/or a curvature (e.g., the radius) of the driving lane. In general, this can be based on an upcoming part of the lane currently being travelled on from the perspective of the vehicle and/or the direction of travel.

In some examples, the method can also include an additional or alternative step for determining a characteristic value for the uncertainty. In general, this value can be used to quantify the uncertainty with regard to the appropriateness or situation relevance of the displayed object. By way of example, the uncertainty can be expressed with regard to whether the object is actually displayed in the driver's field of view in a manner that is suited to the environment, and in particular the lane. In general, the displayed object can relate to a systemic uncertainty in the display (in particular the positioning, orientation, or general extension of the object). This can be based on whether the driving lane, or the information relating thereto, is obtained with sufficient precision (e.g., with environment sensors, or from map data).

In general, any of the approaches described in DE 10 2017 220 268 A1 (referred to therein as the characteristic value for systemic uncertainty) can likewise be used for determining the uncertainty. The teachings in this regard from DE 10 2017 220 268 A1, as described in particular in paragraphs [0024]-[0029], [0047] and [0054], are incorporated by reference in their entirety herein. Other appropriate means of quantifying the uncertainty, in particular with regard to driving lanes, shall be explained below.

Lane-related displays can be understood to mean that at least one property of the object is based on the driving lane, or information or properties determined therefrom. This information can relate to a position, size, extension, or curvature of the object. These properties of the object are preferably defined independently of the characteristic value, i.e. the length can be the only property that can be adjusted dynamically and/or variably to the uncertainty.

In some examples, the method can be executed in general with a computer, e.g., by a control unit in a head-up display of the type disclosed herein. The control unit can include at least one processor and/or at least one memory. Program instructions can be stored in the memory, with which the processor causes the control unit to execute the steps or measures specified herein.

In general, the displays can be elongated displays or objects. These can be in the form of lines which are continuous, interrupted, or broken lines. The objects can be parallel to the changes in the driving lanes or boundaries thereof. They can be displayed in perspective, e.g., diagonally and tapering toward a virtual horizon.

Under some examples, the assistance function may be configured as a lane keeping assistance function and/or lane centering function. These can be visual displays in particular that facilitate lane keeping or centering for the driver. The displays can visually highlight and/or visually overlap lane boundaries in order to assist in lane keeping. Their color, dimensions, or other properties can also be altered. They can function as a signal if the vehicle is in danger of drifting out of a lane. In particular, this selective signaling can assist the driver in remaining in the intended lane. In the case of lane centering, the center of the lane can also be highlighted, and this highlighting can also be altered analogously, if there is the danger that the vehicle is drifting out of the center of the lane (e.g., in terms of the color, dimensions, or other visual properties).

In some examples, a curvature of the object may be defined according to the magnitude of the characteristic value. If the characteristic value indicates a high level of uncertainty, a curvature can be reduced (in general, higher uncertainty results in less curvature). Alternatively, if a threshold value for the characteristic value is exceeded, which corresponds to a maximum uncertainty, the curvature is limited to a maximum. Alternatively, the curvature can then be reduced to substantially zero.

The basis for this is the idea that when there are problems in detecting the driving lane, the curvature may be detected incorrectly, and/or the results of the curvature detection may change quickly in succession. This can result in quickly changing successive curvatures of the displayed object, which do not correspond to reality, and may be disruptive from the perspective of the driver. By reducing or even suppressing the curvatures of displayed objects, at least these quick successive changes can be prevented.

The transparency of the object can also be defined according to the magnitude of the characteristic value (the transparency is preferably greater when the characteristic value or uncertainty is greater). This makes it possible to indicate that the displayed object is afflicted with an uncertainty, such that feedback is generated regarding the imprecision of the detection of the driving lane.

In general, a higher characteristic value relates to a higher degree of uncertainty. In particular, this relationship can be proportional.

In some examples, the characteristic value may be configured as a function of the detection range of at least one camera for detecting the driving lane. The camera can be one example of an environment sensor in the vehicle. The detection range can be understood to be the range (or maximum distance) within which (or up to which) the camera can record image data with a desired minimum quality. This can be a fixed and known parameter for the camera. The detection range can also be calculated dynamically, and be a function of the weather conditions, etc. detected by the vehicle. A greater detection range results in lower characteristic values and/or uncertainties.

In some examples, the characteristic value is a function of the detection quality of lane markings. For this, image data obtained with a camera can be compared with expected lane markings (obtained, e.g., from map information or derived from comparisons with temporally offset detected lane markings).

In some examples, the characteristic value may be configured as a function of the proximity to an upcoming location at which a steering of the motor vehicle (and/or a curve or change in direction of the driving lane) is anticipated. In particular, the steering can be attributed to a change in the curvature of the lane, e.g., when entering a roundabout, or turning at an intersection. These types of anticipated steering actions can be determined on the basis of planned driving routes (or navigations routes that are to be travelled). The distance to an anticipated location associated with a steering action can be determined on the basis of location information for the motor vehicle (e.g., a GPS position).

Such a configuration is based on the idea that lane markings change significantly at these locations, and/or the vehicle crosses certain lane markings intentionally. It may then be difficult to detect currently relevant lane markings (or other properties of the lane) for a selected lane, and thus to display the object. This configuration therefore provides that these types of locations are determined in advance, and a greater uncertainty is estimated for them, in order to prevent incorrect displays of virtual objects.

In some examples, the characteristic value may be updated continuously, and the length of the object can be altered on the basis thereof. In other words, it can be continuously determined whether there are uncertainties, or to which extent these uncertainties exist, and the length of the objects can be dynamically adjusted accordingly.

In this context, the virtual object can exhibit a lower and upper part in which the lower part is closer to a lower edge of a field of view for the head-up display than the upper part, and the upper part is closer to an upper edge of the field of view than the lower part, and wherein a distance between the upper part and the upper edge is altered in order to adjust and thus dynamically determine the length of the virtual object (in particular, it is changed more than the distance from the lower part to the lower edge).

The field of view can be understood to be the area in which the head-up display can display objects. This can be a known parameter, defined by the hardware properties of the head-up display. The lower edge can be closer than the upper edge from the perspective of the driver, or overlap a closer part of the environment than the upper edge. Accordingly, virtual displays can take place in closer regions from the perspective of the driver through the above changes in distance. This ensures that at least in these areas, immediate assistance is provided. In areas at greater distances to the vehicle, more reliable lane detection can take place when the vehicle approaches these areas, with correct displays of the situations on the basis thereof. In general, lane detections at greater distances to the vehicle may be subjected to greater uncertainties.

Turning to FIG. 1, a head-up display (HUD) 10 is shown, in a simplified, schematic illustration. This may normally be incorporated in an instrument panel in the motor vehicle, and is not visible to the driver.

In this example, the HUD 10 projects virtual objects into a field of view 12. As explained herein, these objects may be configured as two visual or virtual lane boundaries 14. These may be superimposed on the environment from the perspective of the driver, and in this case a driving lane 16 on which the vehicle, which is not otherwise shown in detail, is located.

The HUD 10 may be configured with a control unit 18, which may be connected via a data connection 20 to an environment sensor in the form of a camera 22, which forms an optional feature in the vehicle 10 in this example. The camera 22 can be positioned near the windshield, or be aimed through the windshield, toward the front. It records image data relating to the lane 16 on which the vehicle is currently travelling.

The HUD 10 is preferably connected to a memory 24 via another data connection 20. This can be optionally integrated in the HUD 10, or in another component in the vehicle 10. This can also be an external device, such as an external server. Map data are stored in the memory 24.

The control unit 18 for the HUD 10 may be configured to establish predetermined properties of the lane 16 according to any of the approaches described herein on the basis of map data and/or the image data from the camera 22.

This illustration shows a curvature in the lane 16 in particular, or its general extension or course. Corresponding properties of the section of the lane 16 contained in the field of view 12 can also be determined therefrom. As explained below, the virtual objects 14 may be generated and displayed on the basis of these properties (e.g., curved).

The control unit 18 may also be configured to determine an uncertainty in the information obtained in reference to the lane 16 (such as image data and/or map data) in accordance with any of the approaches described herein. More precisely, it quantifies this uncertainty in the form of a characteristic value, which preferably increases with the uncertainty.

The control unit 18 may be configured to display the virtual objects 14 according to the magnitude of the detected properties of the lane 16 as well as the characteristic value. The display of the virtual objects 14, and in particular their dimensions, are dynamically adjusted to the changing properties as well to a change in the characteristic value.

FIG. 1 shows a case in which the uncertainty is extremely low. The characteristic value is also correspondingly low. The HUD 10 then displays substantially ideal or unaltered virtual objects 14 with a maximum length of L1 that serve as a lane keeping assistance.

In this example, the virtual objects 14 are each elongated, and form lines extending along the right and left lane boundaries 17, 19. They run from a lower edge U to an upper edge O in the field of vision 12 from the perspective of the driver, wherein the courses of these objects taper toward the top, and are slanted toward one another, in order to optionally generate a perspective effect analogous to the course of the lane boundaries 17, 19.

The virtual objects 14 serve in the known manner per se as lane boundaries, the colors of which change if the driver threatens to drift out of the lane 16. A virtual (and in particular visual) lane keeping assistance is provided by this means.

The objects 14 each have a lower part 26 near the lower edge U and an upper part 28 near the upper edge O. A distance between the lower part 26 and the lower edge U normally remains constant at zero, wherein the lower parts 26 may extend all the way to the lower edge U of the field of view.

A distance from the upper part 28 to the upper edge O corresponds to a minimum distance (not separately indicated) based on the maximum length L1 of the object 14. Alternatively, this distance can also be defined in relation to an artificial or virtual horizon 30, and is indicated in FIG. 1 as the distance D1, by way of example.

Figure 2:
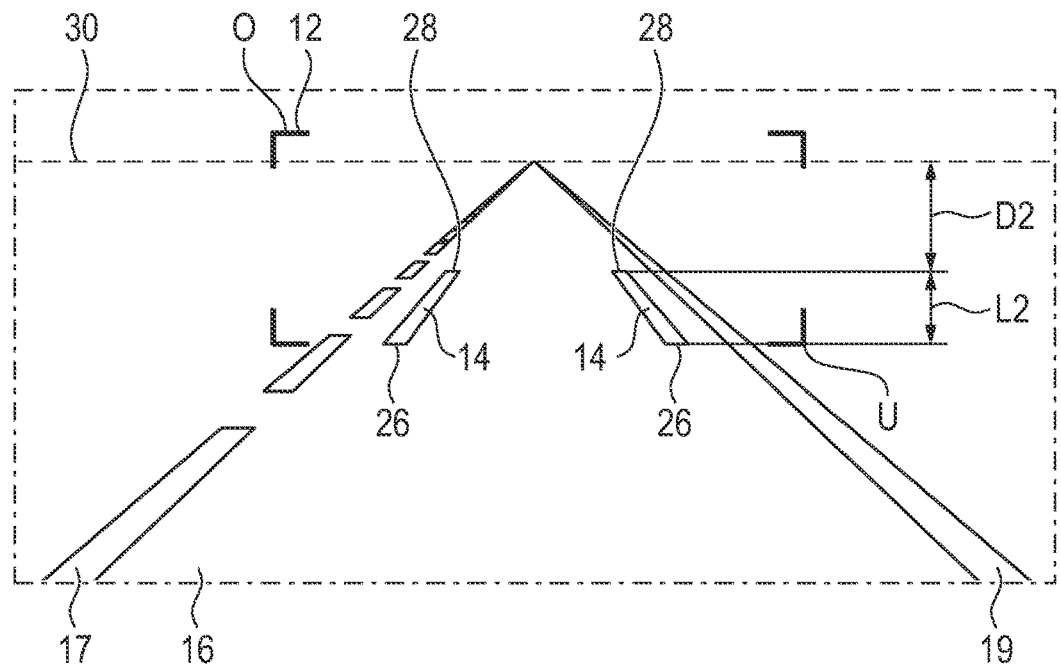
FIG. 2 shows a display analogous to that in FIG. 1, in which the virtual objects are shortened in comparison to that in FIG. 1, due to an increased uncertainty, according to some aspects of the present disclosure.

In FIG. 2, in which the HUD 10 is not separately indicated, an example is illustrated in which the uncertainty, and therefore the associated characteristic value, are high. As a result, the length of the objects 14 is reduced in comparison with the scenario shown in FIG. 1. More precisely, the length is reduced to the value L2. The lower parts 26 of the objects 14 remain at the lower edge U of the field of view 12. The reduction in length is therefore obtained in that the distance from the upper part 28 of the objects 14 to the upper edge O of the field of view 12 is increased. This is indicated by the greater distance D2 to the artificial horizon 30.

LIST OF REFERENCE SYMBOLS 10 head-up display
12 field of view
14 virtual object
16 driving lane
17, 19 lane boundaries
20 data connection
22 camera
24 memory
26 lower part
28 upper part
30 artificial horizon
O upper edge
U lower edge
L1, L2 lengths
D1, D2 distances

The invention claimed is:

1. A method for providing a lane-related visual assistance function for a head-up display of a motor vehicle, comprising:
obtaining information regarding a driving lane currently travelled by the motor vehicle;
obtaining a characteristic value that quantifies an uncertainty regarding a precision of the lane-related display of at least one virtual object configured as a visual assistance function with the head-up display;
displaying the at least one virtual object as a visual assistance function, wherein the at least one virtual object is displayed such that it runs along at least a portion of the lane from the perspective of a driver; and
wherein a length of the at least one virtual object along the lane is defined according to a magnitude of the characteristic value.

2. The method of claim 1, wherein the visual assistance function comprises a lane keeping assistance function.

3. The method of claim 1, wherein a curvature of the at least one virtual object is also defined according to the magnitude of the characteristic value.

4. The method of claim 1, wherein a transparency of the at least one virtual object is also defined according to the magnitude of the characteristic value.

5. The method of claim 1, wherein the characteristic value comprises a function of a detection range of at least one camera.

6. The method of claim 5, wherein the characteristic value comprises a function of a proximity to an upcoming location at which a steering action by the motor vehicle is anticipated.

7. The method of claim 1, wherein the characteristic value is updated continuously, and the lengths of the at least one virtual object is varied on the basis thereof.

8. The method of claim 7, wherein, the at least one virtual object comprises:
a lower part and an upper part, wherein the lower part is closer to a lower edge of a field of view for the head-up display than the upper part, and the upper part is closer to an upper edge of the field of view than the lower part,
and wherein a distance from the upper part to the upper edge is altered to adjust and vary the length of the virtual object.

9. The method of claim 8, wherein a distance from the lower part to the lower edge of the field of view is constant.

10. A head-up display for a motor vehicle, comprising:
a processor; and
a memory, operatively coupled to the processor, wherein the processor and memory are configured to:
obtain information regarding a driving lane currently travelled by the motor vehicle;
obtain a characteristic value comprising a function of a detection range of at least one camera, wherein the characteristic value quantifies an uncertainty regarding a precision of the lane-related display of at least one virtual object configured as a visual assistance function with the head-up display; and
display the at least one virtual object as a visual assistance function, wherein the at least one virtual object is displayed such that it runs along at least a portion of the lane from the perspective of a driver;
wherein a length of the at least one virtual object along the lane is defined according to a magnitude of the characteristic value.

11. The head-up display of claim 10, wherein the visual assistance function comprises a lane keeping assistance function.

12. The head-up display of claim 10, wherein a curvature of the at least one virtual object is also defined according to the magnitude of the characteristic value.

13. The head-up display of claim 10, wherein a transparency of the at least one virtual object is also defined according to the magnitude of the characteristic value.

14. The head-up display of claim 13, wherein the characteristic value comprises the function of a detection range of at least one camera, and wherein the detection range is dynamically adjusted based on environmental conditions.

15. The head-up display of claim 14, wherein the characteristic value comprises a function of a proximity to an upcoming location at which a steering action by the motor vehicle is anticipated.

16. The head-up display of claim 10, wherein the characteristic value is updated continuously, and the lengths of the at least one virtual object is varied on the basis thereof.

17. The head-up display of claim 16, wherein, the at least one virtual object comprises:
a lower part and an upper part, wherein the lower part is closer to a lower edge of a field of view for the head-up display than the upper part, and the upper part is closer to an upper edge of the field of view than the lower part,
and wherein a distance from the upper part to the upper edge is altered to adjust and vary the length of the virtual object.

18. The head-up display of claim 17, wherein a distance from the lower part to the lower edge of the field of view is constant.

19. A method for operating a head-up display for a motor vehicle, comprising:
- obtaining information regarding a driving lane currently travelled by the motor vehicle;
- obtaining a characteristic value that quantifies an uncertainty regarding a precision of the lane-related display of at least one virtual object configured as a visual assistance function with the head-up display;
- displaying the at least one virtual object as a visual assistance function, wherein the at least one virtual object is displayed such that it runs along at least a portion of the lane from the perspective of a driver; and
- wherein a length of the at least one virtual object along the lane is defined according to a magnitude of the characteristic value.

* * * * *